(12) United States Patent
Edwards et al.

(10) Patent No.: US 6,997,303 B2
(45) Date of Patent: Feb. 14, 2006

(54) CARRIER CONVEYOR SYSTEM

(75) Inventors: Melvin A. Edwards, Livonia, MI (US); Christopher L. Audia, Belleville, MI (US); Kelsey R. Schell, Brighton, MI (US); David M. Stewart, Livonia, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 0 days.

(21) Appl. No.: 10/421,354

(22) Filed: Apr. 23, 2003

(65) Prior Publication Data

US 2003/0201147 A1    Oct. 30, 2003

Related U.S. Application Data

(60) Provisional application No. 60/375,283, filed on Apr. 24, 2002.

(51) Int. Cl.
  *B65G 17/42*    (2006.01)
  *B65G 7/12*    (2006.01)

(52) U.S. Cl. .................... 198/345.2; 104/172.1
(58) Field of Classification Search ............ 198/345.2, 198/347.1, 345.1, 465.1, 781, 465.4, 747; 104/172.1, 172.4, 162
  See application file for complete search history.

(56) References Cited

U.S. PATENT DOCUMENTS

| | | | |
|---|---|---|---|
| 2,634,851 A | | 4/1953 | Steinhoff |
| 2,816,643 A | | 12/1957 | Klamp |
| 2,844,241 A | | 7/1958 | King |
| 2,883,942 A | | 4/1959 | Johnson |
| 3,511,187 A | | 5/1970 | Hanna |
| 3,518,946 A | | 7/1970 | Kavieff |
| 3,707,923 A | * | 1/1973 | Woodling .................. 104/137 |
| 3,948,186 A | * | 4/1976 | McCaul .................. 104/172.4 |
| 4,548,135 A | | 10/1985 | Kupczyk |
| 4,564,100 A | | 1/1986 | Moon |
| 4,584,944 A | * | 4/1986 | Dehne ........................ 104/89 |
| 4,616,570 A | * | 10/1986 | Dehne .................... 104/172.3 |
| 4,646,915 A | | 3/1987 | Ohtaki et al. |
| 4,669,388 A | * | 6/1987 | Dehne et al. ............... 104/162 |
| 4,745,865 A | * | 5/1988 | Dehne .................... 104/172.3 |
| 4,771,697 A | * | 9/1988 | Dehne ........................ 104/89 |
| 4,776,085 A | | 10/1988 | Shiiba |
| 4,924,777 A | | 5/1990 | Linton et al. |
| 4,928,383 A | * | 5/1990 | Kaczmarek et al. ......... 29/711 |
| 4,930,213 A | | 6/1990 | Hayakawa et al. |
| 4,937,929 A | | 7/1990 | Nokajima et al. |
| 4,947,978 A | | 8/1990 | Rhodes |

(Continued)

FOREIGN PATENT DOCUMENTS

CA    2 355 018    2/2002

(Continued)

*Primary Examiner*—Douglas Hess
(74) *Attorney, Agent, or Firm*—Dickinson Wright PLLC

(57) ABSTRACT

The present invention is directed to a carrier and conveyor system that permits the carrier to be driven by at least two different types of conveyors or drive assemblies, including a power and free conveyor. The system includes a plurality of carriers, first and second areas, a power and free conveyor assembly, and a friction drive assembly. The power and free conveyor drivably engages the first and second carriers when the carriers are in the first area and is out of driving engagement with the carriers in the second area. The friction drive assembly is engageable with each carrier when the carriers are in the second area and out of driving engagement with each carrier when the carriers are in the first area.

19 Claims, 3 Drawing Sheets

U.S. PATENT DOCUMENTS

| | | | |
|---|---|---|---|
| 4,989,723 A | 2/1991 | Bode et al. | |
| 5,012,749 A | 5/1991 | Passage, Jr. | |
| 5,012,917 A | 5/1991 | Gilbert et al. | |
| 5,195,630 A | 3/1993 | Donovan et al. | |
| 5,220,996 A | 6/1993 | Noestheden | |
| 5,237,931 A * | 8/1993 | Riedl | 104/28 |
| 5,318,167 A | 6/1994 | Bronson et al. | |
| 5,322,156 A | 6/1994 | Kakita et al. | |
| 5,449,063 A | 9/1995 | Thomas, Sr. | |
| 5,465,826 A | 11/1995 | Noestheden | |
| 5,517,922 A * | 5/1996 | Summa et al. | 104/172.3 |
| 5,556,466 A | 9/1996 | Martin et al. | |
| 5,577,593 A | 11/1996 | Hooper | |
| 5,669,309 A * | 9/1997 | Carlton et al. | 104/162 |
| 5,692,597 A | 12/1997 | Ferguson | |
| 5,850,902 A | 12/1998 | Hicks et al. | |
| 5,873,165 A * | 2/1999 | Bode et al. | 29/897.2 |
| 5,988,363 A | 11/1999 | Takahashi et al. | |
| 6,142,293 A | 11/2000 | Ozawa et al. | |
| 6,176,367 B1 | 1/2001 | Patrito | |
| 6,234,303 B1 | 5/2001 | Gales et al. | |
| 6,374,993 B1 * | 4/2002 | Tetzloff | 198/682 |
| 6,464,066 B1 | 10/2002 | Bethke et al. | |
| 6,494,304 B1 * | 12/2002 | Jaynes et al. | 198/345.2 |
| 6,679,370 B1 * | 1/2004 | Kasagi | 198/465.1 |
| 2003/0010608 A1 | 1/2003 | Jaynes | |

FOREIGN PATENT DOCUMENTS

| | | |
|---|---|---|
| EP | 0 451 716 A2 | 10/1991 |
| EP | 0 492 180 A1 | 7/1992 |

* cited by examiner

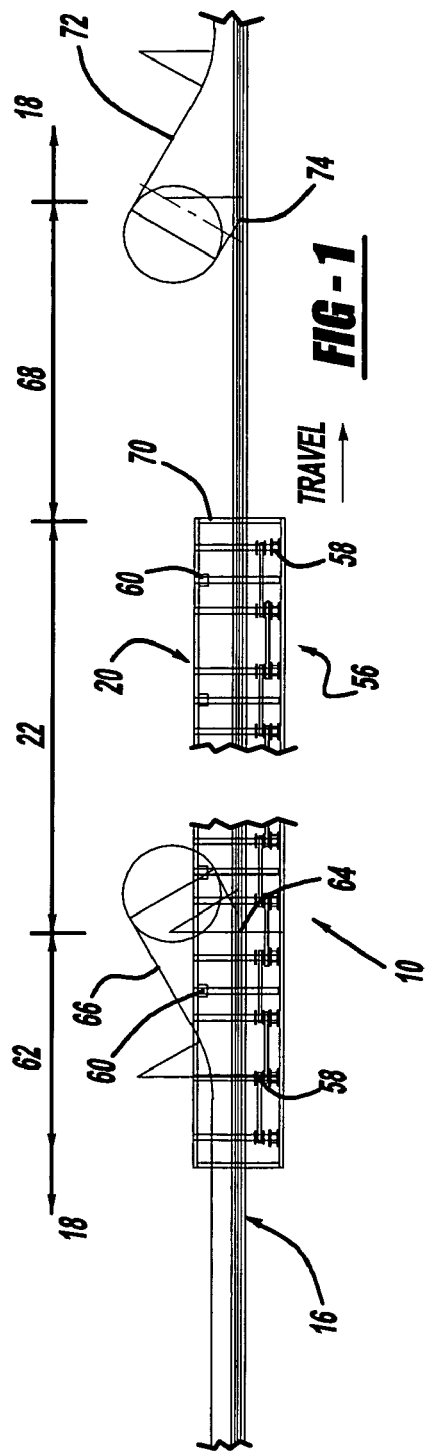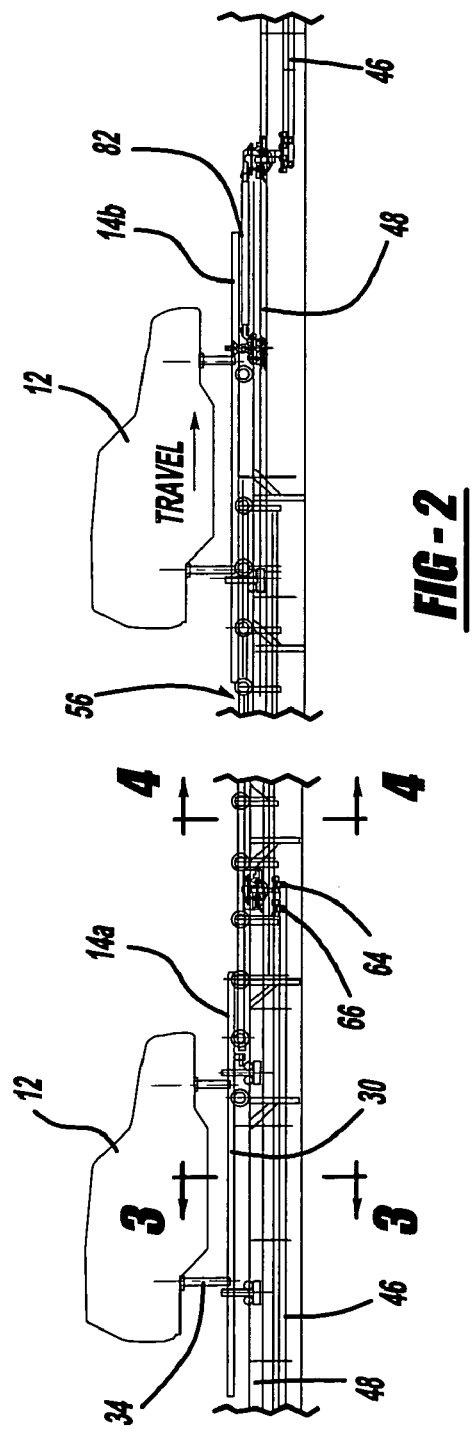

CARRIER CONVEYOR SYSTEM

CROSS-REFERENCE TO RELATED APPLICATION

This application claims the benefit of U.S. Provisional Application No. 60/375,283, filed Apr. 24, 2002, the entire disclosure of the application is considered part of the disclosure of this application and is hereby incorporated by reference.

BACKGROUND OF THE INVENTION

The present invention relates to a conveyor system for transporting carriers through a production facility and, more particularly, to a conveyor system that includes a power and free conveyor to transport the carriers through a first area and a second conveyor assembly to transport the carriers through a second area.

Conveyor systems are commonly used in manufacturing environments to transport workpieces. In many of these systems, the workpiece(s) is mounted to a carrier that is then drivably engaged by a conveyor. A number of conveyor and carrier styles are available in the art with a suitable configuration being selected based upon the demands of a particular application. In many complex manufacturing environments it is desirable to capitalize upon the operational benefits of different conveyor systems. In such instances, it is commonly necessary to transfer workpieces to and from carriers that are specifically configured for use with the particular conveyor.

Conventional skid conveyors, a combination of a skid and truck with rollers, with a chain on edge as the primary truck drive have been combined with a roller or belt conveyor to drive the truck in areas where accumulation, indexing, and switching of the trucks and workpieces is desired. However, in these systems, the accumulation, indexing, and switching capabilities are limited to areas where the chain drive is disengaged from the trucks. Further, the trucks are provided with additional components, such as rollers, to stabilize the truck when driven by the chain.

Power and free conveyors are also commonly used in the art to provide accumulation, indexing, and switching of carriers. However, power and free conveyors generally lack the degree of stability desired for certain assembly operations. Accordingly, the art has failed to develop a conveyor system that provides accumulation, indexing, and switching capabilities outside of assembly areas and adequate stability within the assembly areas.

SUMMARY OF THE INVENTION

With the above in mind, the present invention is directed to a carrier and conveyor system that permits the carrier to be driven by at least two different types of conveyors or drive assemblies so as to provide a conveyor system having benefits and advantages not previously achieved in the art. More particularly, the invention is directed to a carrier (such as a skid) and a conveyor system that includes a power and free conveyor for moving the carrier through a first area and a friction drive assembly (such as a roller conveyor, belt conveyor, or other friction drive) that moves the carriers through a second area.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 1 is a top plan view of the present invention;

FIG. 2 is a side elevational view of the system shown in FIG. 1;

DETAILED DESCRIPTION OF THE PREFERRED EMBODIMENT

Figure 5:
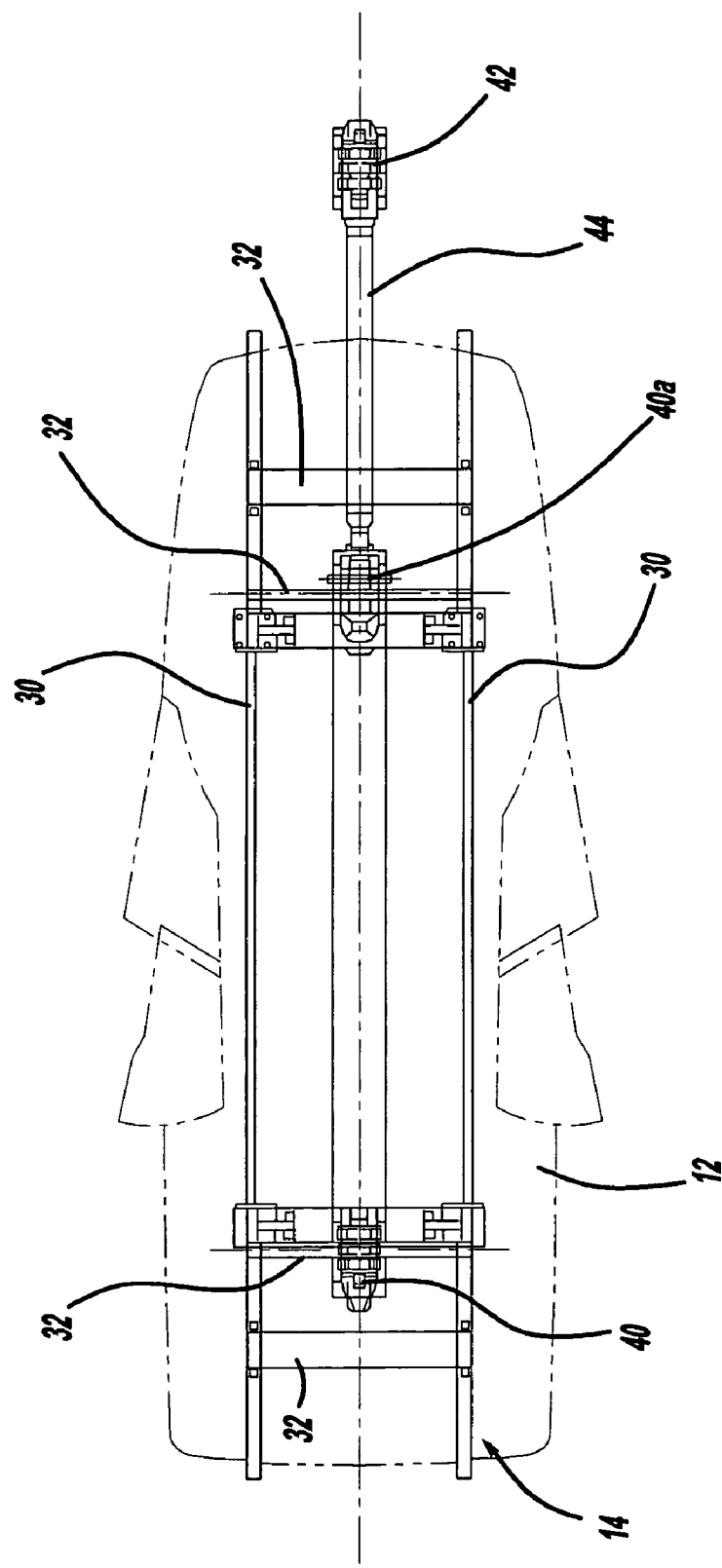
FIG. 5 is a plan view of a skid carrier according to the present invention.

As is shown in the attached drawings, the present invention is generally directed to a production operation 10 wherein workpieces 12 (such as the illustrated automobile bodies) are mounted to carriers 14, such as the illustrated skids, and transported by a conveyor system that includes a power and free conveyor 16 for driving the carriers in a first area 18 and a second drive assembly 20, such as the illustrated roller tables, for driving the carriers in a second area 22. In the illustrated embodiment, the skid carrier 14 has laterally spaced rails 30 (FIG. 5), cross members 32, and support legs 34 (FIG. 2) to which a workpiece is mounted. Free trolleys 40 are fixed to move with each carrier 14 and a drive trolley 42 is movably coupled to the front free trolley 40a by a tow bar 44. As illustrated in the drawings, the free and drive trolleys 40 and 42 are preferably positioned laterally between the skid rails and, even more preferably, centered therebetween.

Figure 3:
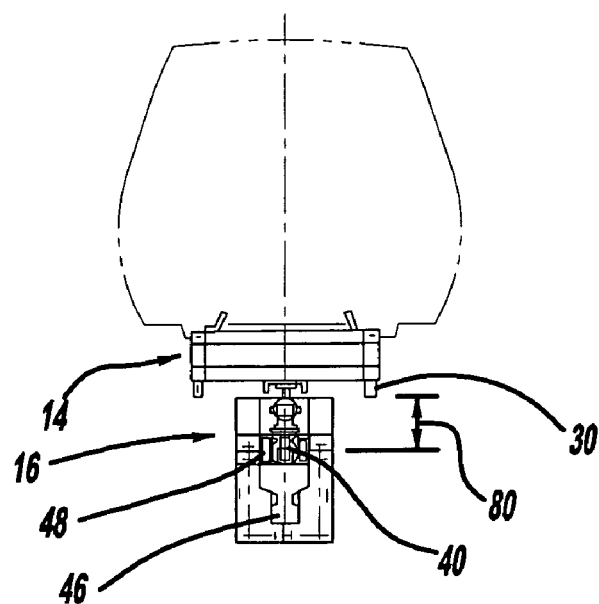
FIG. 3 is a sectional view taken along the line 3—3 shown in FIG. 2.

As is shown in FIG. 3, the power and free conveyor 16 includes a power track 46 and a free track 48. As is conventional, the free and drive trolleys coupled to the carriers ride in the free track 48 and the power chain is disposed for movement in the power track 46. When the carrier is driven by the power and free conveyor, the power track 46 is vertically aligned below the free track 48 such that the power chain engages the drive trolley to move the carrier. Thus, the carrier may be moved through selected first areas of the production operation by a standard power and free conveyor 16 thereby realizing the cost and operational benefits of such a conveyor.

While power and free conveyors efficiently transport articles through a variety of manufacturing environments, there are instances where other conveyor or drive mechanisms may be uniquely suited for a particular application. For example, skids are commonly transported along conveyor tables that permit the indexing of carriers for downstream processing. Such skid conveyor tables may include alternative drive components such as rollers, belts, and/or friction drives that engage the spaced skid rails to support and transport the skids. A representative roller table 56 is shown in FIGS. 1 and 2. While the roller table may include driven rollers on both sides of the table, the table 56 is shown to include driven rollers 58 on one side of the table and idler rollers 60 on the opposite side. The driven and idler rollers are spaced to align with the spaced rails 30 on the skid carrier 14. Thus, the skid 14 is transported along the roller table through frictional engagement of the rollers with the spaced rails.

The transfer of the carriers between the power and free conveyor and the roller conveyor illustrated in FIGS. 1 and 2 will now be described. When a carrier 14a enters a first transfer zone 62 positioned between the first and second areas 18 and 22, the skid rails 30 engage and ride onto the roller table 56. When the drive trolley 42 reaches a wipe-off point 64, the power chain 66 is disengaged from the drive trolley and the carrier is transferred to the second drive assembly, e.g., the roller table 56. The wipe-off point 64 is positioned so that the second drive assembly engages a sufficient distance of the carrier rails to transport the carrier into and through the second area 22. In the illustrated embodiment it is preferred that the skid rails engage two or three power rollers on the table when the power chain is disengaged from the drive trolley 42 (FIG. 2).

Similarly, when a carrier, e.g., 14b, enters a second transfer zone 68 at the downstream end 70 of the second area 22, a power chain 72 engages the drive trolley 42 at a wipe-on point 74. While two separate power chains 66 and 72 are illustrated in FIGS. 1 and 2, those skilled in the art will appreciate that a single power chain may be used. The wipe-on point is again preferably positioned such that the chain engages the drive trolley when the skid rails engage the last two or three driven rollers on the table. Thus, in the first and second transfer zones, the carrier engages the drive elements of the secondary drive mechanism, e.g., the illustrated driven rollers 58, and the power chain engages the drive trolley 42. This dual drive in the transfer zones facilitates transfer of the carriers between the power and free conveyor and the second drive assembly.

Figure 4:
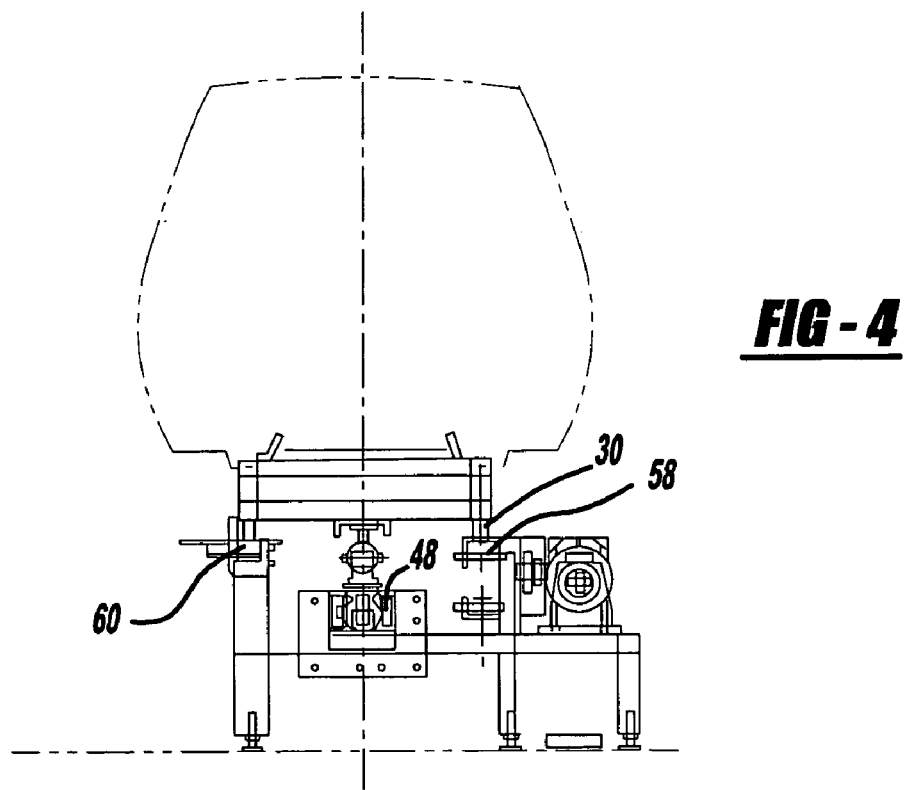
FIG. 4 is a sectional view taken along the line 4—4 shown in FIG. 2.

As noted above, the drive and free trolleys 42 and 40 coupled to each carrier 14 ride in the free track 48 as the carrier 14 is driven by the second drive assembly, e.g., roller table 56. In order to ensure that the free trolleys do not impact the engagement between the driven rollers 58 and the skid rails 30, the vertical spacing 80 (FIG. 4) between the free track 48 and skid rails 30 is increased in second area 22. More particularly, when the carrier is driven solely by the power and free conveyor, the spacing 80 between the free track 48 and the bottom of the skid rails 30 is dictated by the configuration of the trolleys and carrier. In the second area 22, the spacing is dictated by the distance between the upper surface of the rollers 58 and 60 and the free track elevation. Thus, the spacing 80 is increased in the second area by placing the elevation of the rollers 58 and 60 higher than the elevation of the approaching skid rails 30 thereby raising the rails as they engage the rollers. While the increase in spacing may vary depending upon the configuration of the trolley and the connector pin pedestal, the change in spacing is generally on the order of less than one-half inch and preferably approximately one-eighth inch.

To facilitate the movement of the skid rails onto the roller table 56 in the entrance transfer zones, each skid rail preferably includes a beveled front section 82 (FIG. 2) that creates a tapered engagement with the first rollers on the table. It should be appreciated that various other modifications may be made to the configuration of the skid and/or roller table to facilitate transfer of the carrier between the different drive mechanisms.

Based on this description and the appended drawings, it should be apparent that by fixing the trolleys to the carriers and modifying the configuration of the roller table to include a free track that accommodates the trolleys when the carrier is being transported by the roller table, the present invention permits the use of a power and free conveyor in a first area and a second drive assembly in a second area without requiring the transfer of the workpiece or article to a different carrier. The invention has been described with reference to the transportation of a skid through a production facility. However, those skilled in the art will appreciate that a variety of carrier configurations may be used without departing from the scope of the invention. Other exemplary carrier configurations include a skillet or pallet as described in Applicant's U.S. Pat. No. 6,494,304 issued Dec. 17, 2002 and entitled "Production Operation With Power And Free Pallet Conveyor," which is hereby incorporated by reference in its entirety. Further, while the second conveyor assembly is illustrated and described herein as a skid table, using either rollers or belts to engage and transport the skid, it should be appreciated that other conveyor assemblies may be used. For example, the system described in U.S. Pat. No. 6,494,304 describes a friction drive assembly that engages the sides of the pallet or skillet to move the carrier through a production area.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A production operation comprising:
    a carrier;
    a first area;
    a second area;
    a power and free conveyor assembly drivably engageable with the carrier when the carrier is in the first area to drive the carrier through the first area, said power and free conveyor assembly being out of driving engagement with the carrier when the carrier is in the second area;
    a friction drive assembly engageable with the carrier when the carrier is in the second area to drive the carrier through the second area, said friction drive assembly being out of driving engagement with the carrier when the carrier is in the first area; and
    a transition area between said first area and said second area, wherein said carrier changes elevation as said carrier moves through said transition area.

2. The production operation of claim 1 wherein said power and free conveyor assembly further includes a free track extending through said first and second areas.

3. The production operation of claim 2 wherein the free track is spaced vertically from the friction drive to define a spacing and wherein the spacing is greater in the second area than the first area.

4. The production operation of claim 2 wherein the free track has an elevation that is higher in the first area than the second area.

5. The production operation of claim 2 wherein said carrier includes a skid rail and wherein said skid rail has a first vertical spacing between said skid rail and said free track in said first area and a second vertical spacing between said skid rail and said free track in said second area.

6. The production operation of claim 5 wherein said second vertical spacing is greater than said first vertical spacing.

7. The production operation of claim 6 wherein the difference between said first and second vertical spacing is approximately less than one-half inch.

8. The production operation of claim 1 further including a trolley fixed to move with the carrier through said first and second areas.

9. The production operation of claim 1 wherein the carrier is a skid having laterally spaced rails and wherein a free trolley is fixed to each skid between the rails.

10. The production operation of claim 1 wherein said friction drive is a roller table.

11. A production operation comprising:
a carrier with a trolley;
a first area;
a second area;
a power and free conveyor assembly driving the trolley in the first area and out of driving engagement with the trolley when the carrier is in the second area, said power and free conveyor assembly having a free track extending through said first and second areas, said trolley moving in said free track through said first and second areas;
a friction drive driving the carrier in the second area and being out of driving engagement with the carrier when the carrier is in the first area, said free track spaced vertically from the friction drive to define a spacing and wherein the spacing is greater in the second area than the first area; and
a transition area between said first area and said second area, wherein said carrier changes elevation as said carrier moves through said transition area.

12. The production operation of claim 11 wherein the elevation of the free track in the first area is higher than the elevation of the free track in the second area.

13. The production operation of claim 11 wherein the spacing between the free track and the friction drive changes in the transition area to move the carrier from driving engagement with one of the power and free conveyor assembly and the friction drive.

14. The production operation of claim 11 wherein the friction drive has an elevation that is higher in the second area than the transition area.

15. The production operation of claim 11 wherein the carrier is a skid having laterally spaced rails and wherein the friction drive is one of a belt or roller.

16. The production operation of claim 11 wherein said carrier includes a skid rail and wherein said skid rail has a first vertical spacing between said skid rail and said free track in said first area and a second vertical spacing between said skid rail and said free track in said second area.

17. The production operation of claim 16 wherein said second vertical spacing is greater than said first vertical spacing.

18. The production operation of claim 17 wherein the difference between said first and second vertical spacing is approximately less than one-half inch.

19. A production operation comprising:
a skid with a trolley, wherein said skid includes laterally spaced rails;
a first area;
a second area;
a power and free conveyor assembly driving the trolley in the first area and out of driving engagement with the trolley when the skid is in the second area, said power and free conveyor assembly having a free track extending through said first and second areas, said trolley moving in said free track through said first and second areas;
a friction drive driving the skid in the second area and being out of driving engagement with the skid when the skid is in the first area, said free track spaced vertically from the friction drive to define a spacing and wherein the spacing is greater in the second area than the first area, and wherein the friction drive is one of a belt or roller and includes driven rollers; and
a transition area between said first area and said second area, wherein said skid changes elevation as said skid moves through said transition area.

* * * * *